US007149556B2

(12) United States Patent
Angelo et al.

(10) Patent No.: US 7,149,556 B2
(45) Date of Patent: Dec. 12, 2006

(54) METHOD AND APPARATUS FOR OPTIMIZED BATTERY LIFE AND AUTHENTICATION IN CONTACTLESS TECHNOLOGY

(75) Inventors: Michael F. Angelo, Houston, TX (US); Raymond A. Toves, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 775 days.

(21) Appl. No.: 10/165,417

(22) Filed: Jun. 7, 2002

(65) Prior Publication Data

US 2004/0204182 A1 Oct. 14, 2004

(51) Int. Cl.

| | |
|---|---|
| ***H04M 11/04*** | (2006.01) |
| ***H04M 1/66*** | (2006.01) |
| ***H04Q 7/20*** | (2006.01) |
| ***H04B 1/38*** | (2006.01) |
| ***H04B 7/00*** | (2006.01) |
| ***H04B 1/04*** | (2006.01) |

(52) U.S. Cl. ...................... 455/574; 455/410; 455/411; 455/404.2; 455/456.1; 455/41.2; 455/127.5

(58) Field of Classification Search ............... 455/41.2, 455/67.11, 421, 522, 572, 574, 575.6, 95, 455/100, 115.1, 127.1, 127.5, 343.2, 343.1, 455/343.3, 410–411, 575.7, 456.1–456.3, 455/556.1, 557–558, 404.2, 90.3; 340/5.61, 340/5.74; 713/182–320; 370/311

See application file for complete search history.

(56) References Cited

U.S. PATENT DOCUMENTS

| | | | | |
|---|---|---|---|---|
| 5,724,426 | A * | 3/1998 | Rosenow et al. | 380/25 |
| 5,757,271 | A * | 5/1998 | Andrews | 340/568.1 |
| 6,046,683 | A * | 4/2000 | Pidwerbetsky et al. | 340/825.54 |
| 6,075,973 | A * | 6/2000 | Greeff et al. | 455/38.2 |
| 6,101,375 | A * | 8/2000 | Tuttle et al. | 455/127 |
| 6,189,105 | B1 * | 2/2001 | Lopes | 713/202 |
| 6,256,476 | B1 * | 7/2001 | Beamish et al. | 455/38.3 |
| 6,600,418 | B1 * | 7/2003 | Sainati et al. | 340/572.1 |
| 6,633,979 | B1 * | 10/2003 | Smeets | 713/151 |
| 6,700,493 | B1 * | 3/2004 | Robinson | 340/573.1 |
| 6,774,797 | B1 * | 8/2004 | Freathy et al. | 340/573.1 |
| 6,825,754 | B1 * | 11/2004 | Rolin | 340/10.34 |
| 2002/0005774 | A1 * | 1/2002 | Rudolph et al. | 340/5.61 |
| 2003/0184475 | A1 * | 10/2003 | Williams et al. | 342/465 |

FOREIGN PATENT DOCUMENTS

| | | | |
|---|---|---|---|
| GB | 2 335 519 A | * | 9/1999 |
| GB | 2 345 178 A | * | 6/2000 |
| WO | WO 99/24894 | * | 5/1999 |
| WO | WO 01/99410 A2 | * | 12/2001 |

* cited by examiner

*Primary Examiner*—Stephen D'Agosta
*Assistant Examiner*—Meless Zewdu

(57) ABSTRACT

A radio frequency (RF) device for authorizing user access to portions of a computer system. The RF device includes a power supply, processing circuitry that accesses the power supply according to a location of the RF device, and an antenna that transmits communication signals from the processing circuitry to a transponder that is coupled to the computer system. The processing circuitry is configured to operate at a first power level until the communication signals indicate that the location of the RF device is within a first range of the transponder. The processing circuitry is configured to begin operations at a second power level after the RF device is positioned within the first range of the transponder. The processing circuitry is also configured to operate at the second power level until the communication signals indicate that the location of the RF device has moved outside of a second range from the transponder.

26 Claims, 4 Drawing Sheets

400

402

Receiver logic latch

404

Power Supply

408

410

Token circuitry

406

METHOD AND APPARATUS FOR OPTIMIZED BATTERY LIFE AND AUTHENTICATION IN CONTACTLESS TECHNOLOGY

BACKGROUND OF THE INVENTION

1. Field of the Invention

The present invention relates to access authentication in a computer system, and more particularly, to optimizing battery life in contactless technology tokens.

2. Description of the Related Art

Automatic identification procedures have become increasingly popular with improvements in computer technology. Different communication protocols exist to authenticate users that attempt to access computer systems, computer networks, etc. Radio frequency (RF) devices are commonly used to automatically identify a person that desires to access a computer system. However, these RF devices suffer from constant battery drainage because the power is always activated as the RF device constantly broadcasts its authentication signal. Past solutions to the constant battery consumption have included offering an on/off switch on the RF device to control transmissions from the RF device when authentication is not needed and thus conserve battery power of the RF device. Among other things, this solution is cumbersome and fails to optimize the battery power savings with authentication transmissions.

Many other problems and disadvantages of the prior art will become apparent to one of ordinary skill in the art when comparing the prior art with the present invention as described herein.

BRIEF SUMMARY OF THE INVENTION

Various aspects of the present invention are realized with a radio frequency (RF) device for authorizing user access to portions of a computer system. The RF device includes a power supply, processing circuitry that accesses the power supply according to a location of the RF device, and an antenna that transmits communication signals from the processing circuitry to a transponder that is coupled to the computer system. The processing circuitry is configured to operate at a first power level until the communication signals indicate that the location of the RF device is within a first range of the transponder. The processing circuitry is configured to begin operations at a second power level after the RF device is positioned within the first range of the transponder. The processing circuitry is also configured to operate at the second power level until the communication signals indicate that the location of the RF device has moved outside of a second range from the transponder.

The RF device may use the communication signals to verify that the RF device is an authorized device prior to activating user access to the portions of the computer system. The RF device may also use the communication signals to verify that the computer system is an authorized computer system for the RF device to activate prior to the RF device operating at the second power level. The processing circuitry of the RF device typically identifies the location of the RF device through communication signals that are received through the antenna on the RF device. The processing circuitry may operates at the first power level when the processing circuitry is unable to identify the location of the RF device. In some embodiments, the computer system is completely inaccessible by a user when the computer system is unable to identify the location of the RF device. Also, the computer system may periodically validate itself to the RF device and the RF device may periodically validate itself to the computer system. The RF device may include a key that is provided to the processing circuitry that the processing circuitry requires for high power transactions. The key for the high power transactions may be modified over time, such as when a particular event occurs, e.g., when a predetermined number of packets have passed a check point. A common distance for the first range is from about five to twenty centimeters, while the second range is commonly from about five to twenty meters.

Other aspects of the present invention are realized with a radio frequency (RF) device for authorizing user access to portions of a computer system. The RF device includes a power supply, processing circuitry that accesses the power supply according to a location of the RF device, and an antenna that transmits communication signals from the processing circuitry to a transponder that is coupled to the computer system. The processing circuitry is configured to operate at a first power level until authentication signals verify that the location of the RF device is within a first range of the transponder at which time the processing circuitry begins operations at a second power level. The processing circuitry is configured to operate at the second power level until the location of the RF device is detected to have moved outside of a second range from the transponder.

Still other aspects of the present invention are realized through a method for an RF device to conserve power while controlling user access to a computer system having a transponder. The method involves operating the RF device in a low power mode; placing the RF device within ten centimeters of the transponder to initiate RF communications between the RF device and the computer system while the RF device remains in the low power mode; authenticating a valid identity for the RF device; identifying portions of the computer system that a user with the RF device is permitted to access; activating the identified portions of the computer system; and activating a high power state in the RF device that permits the RF device to maintain the activation of the identified portions of the computer system while the RF device remains within 10 meters of the transponder.

The method may also include deactivating the high power state in the RF device when the RF communications between the RF device and the computer system cease. It should be noted that prior to activating the high power state in the RF device, the method may include authenticating the computer system as a valid computer system for operations with the RF device.

DETAILED DESCRIPTION OF THE INVENTION

Figure 1:
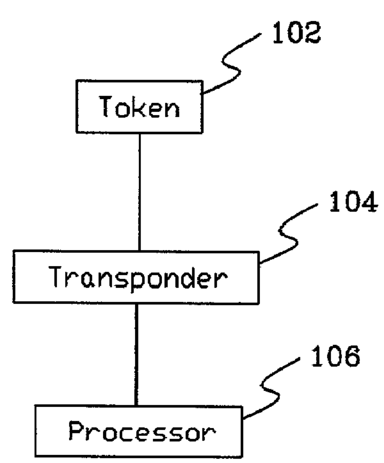
FIG. 1 is a block diagram of basic components that are involved in understanding principles of the present invention.

FIG. 1 is a block diagram of basic components that are involved in understanding principles according to the present invention. A token 102 is a radio frequency (RF) device that communicates with a transponder 104 and processor 106. Token 102 communication with the processor 106 depends, in part, upon the power state of the token 102. In one embodiment, the token 102 operates in either a low or a high power state. For example, when the token 102 operates in a low power state, a short range between the token 102 and the transponder 104 is required for communications between the token 102 and the processor 106. The token 102 operates in a low power state, among other things, to conserve the amount of power that is consumed by the token's power source (see FIG. 4) when the processor 106 is not activated. The token 102 periodically pulses a short range RF signal to request if the transponder 104 is within communication range. Until the token 102 detects that the transponder 104 is within range, e.g., within approximately five to twenty centimeters, the token 102 remains in the low power state. Of course, five to twenty centimeters is an exemplary range for activation and is used for purpose of understanding principles of the present invention. Those of ordinary skill in the art will understand that the range may be modified according to user needs in a particular embodiment.

When the token 102 is within range of the transponder 104, the processor 106 validates authentication information from the token 102. If the authentication information is validated, the processor 106 is released for access by a user, preferably the person that is in possession of the token 102.

The token 102 is then placed into a high power state. Although the high power state of the token 102 consumes a greater amount of power than the low power state, the high power state, among other things, offers a greater range for communications between the token 102 and the transponder 104 and thus the processor 106. The processor 106 periodically checks for the presence of the token 102 and continues to allow access until the token 102 is out of range of the processor 106. The token 102, in its low power state, is required to be within a first range (approximately five to ten or twenty centimeters) of the transponder 104 to communicate with the processor 106. In its high power state, the token 102 may be moved up to a second range (approximately five to ten or twenty meters) from the transponder 104 before the processor 106 is deactivated and access to the processor 106 is denied. Of course, the first and the second ranges of the token 102 varies with the token 102 and processor 106 configurations. As such, the range distances specified above are exemplary only and may be modified accordingly to the needs of a particular embodiment.

Figure 2:
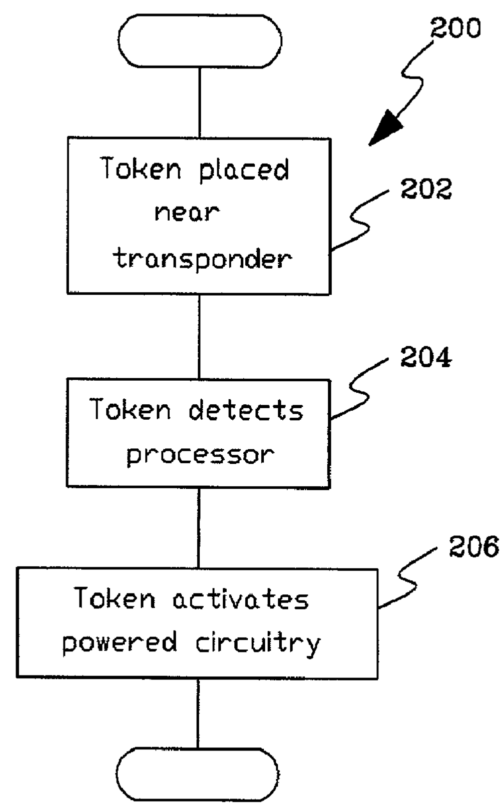
FIG. 2 is a flow diagram of a method that demonstrates fundamental power saving techniques when using the components of FIG. 1.

FIG. 2 is a flow diagram 200 of a method that demonstrates fundamental power saving techniques when using the components of FIG. 1. The token 102 is typically in the possession of a person that periodically accesses a computer system such as the processor 106. When the person is apart from the processor 106 and not accessing the processor 106, the token 102 is in a low power state. In the low power state, when the token 102 is located more than a predetermined distance, e.g., ten centimeters from the transponder 104, the token 102 does not communicate with the processor 106. Because the token 102 is operating in the low power state, its identifying information is not received by the transponder 104. The method of FIG. 2 begins with the step 202 of placing the token 102, in its low power state, near the transponder 104. Although the token 102 is operating in the low power state, in the following step 204, the token 102 detects an activating signal from the processor 106. Once the token 102 detects the activating signal from the processor 106, the token 102 activates its high powered circuitry 206 which allows the token 102 to travel up to approximately five to twenty meters away from the transponder 104 prior to losing communications with the processor 106. Of course, the five to twenty meter range is exemplary only and, upon viewing the present disclosure, will be understood by those of ordinary skill in the art to be a flexible range. When communications with the processor 106 are lost, the processor 106 is deactivated for lack of a validating token and the token 102 is returned to its low power state to conserve battery/power supply power.

Figure 3:
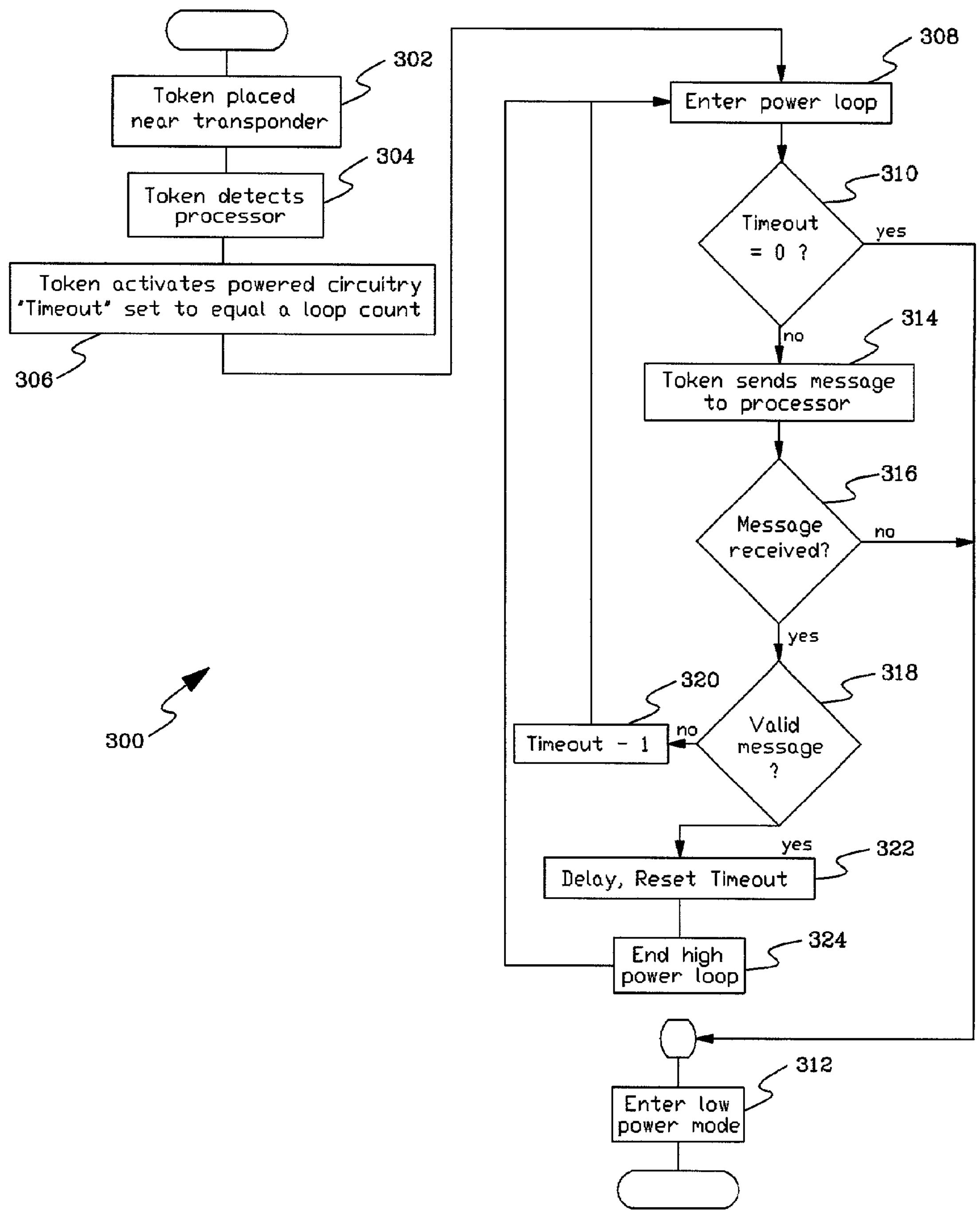
FIG. 3 is a flow diagram of an exemplary embodiment of a method for conserving power that is consumed by a token that operates according to principles of the present invention.

FIG. 3 is a flow diagram 300 of an exemplary embodiment of a method for conserving token power in a token that operates according to principles of the present invention. In the embodiment of FIG. 3, in the first step 302, the token 102 is placed near the transponder 104. In the next step 304, the token 102 detects the processor 106 and, in turn, the token 102 is set to a high power state with a variable, "Timeout," being set to equal a loop count value 306. The loop count value is the number of invalid messages that the processor 106 will tolerate before instructing the token 102 to drop back into its low power state.

Specifically, after the token 102 has its high power state activated and 'Timeout' is set to equal the loop count, the token 102 enters a power loop 308. In the next step 310, if 'Timeout' is found to be zero, then the token 102 returns to the low power state 312, otherwise, the token 102 sends a message to the processor 314. In the next step 316, if the processor 106 indicates that the message was not received by the processor 106, the token 102 returns to the low power state, otherwise, the message is checked for validity 318. An invalid message causes Timeout to be decremented by one 320 and the flow diagram 300 returns to the beginning of the power loop 308 for another loop iteration. On the other hand, a valid message from the token 102 leads to a delay 322 and a reset of the 'Timeout' variable. After the delay 322, the power loop completes 324 and returns for another iteration.

Figure 4:
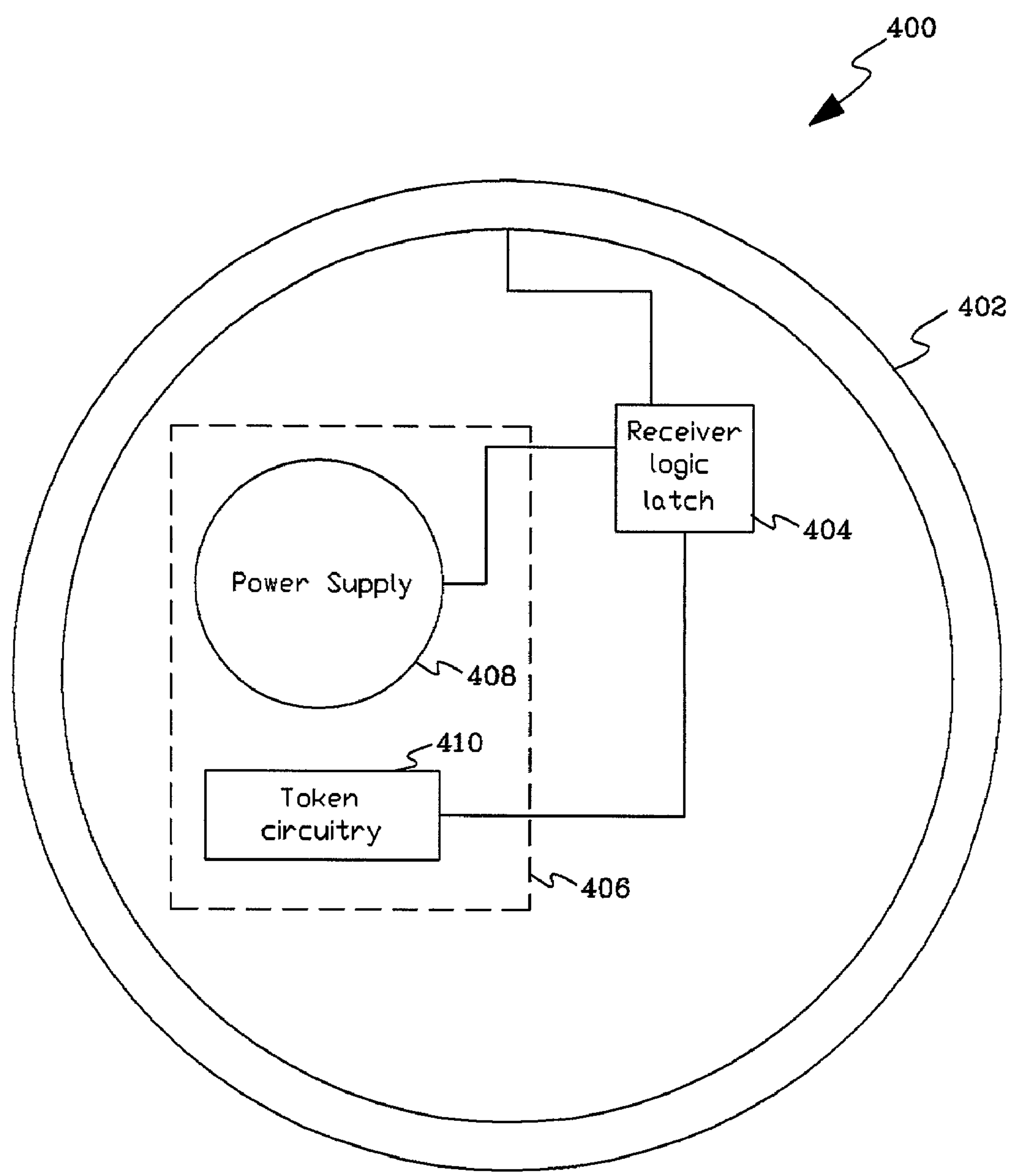
FIG. 4 illustrates an exemplary embodiment of a token that operates with power saving techniques such as found in FIG. 2.

FIG. 4 illustrates an exemplary embodiment of a token 400 that operates with power saving techniques such as found in the flow diagram 200. The token 400 includes an antenna 402 that is electrically coupled to a receiver logic latch 404. The receiver logic latch 404 is electrically coupled to wired communication hardware 406 such as an RFID (Radio Frequency Identifier) 406 that is made up of a power supply 408 and token circuitry 410. The token circuitry 410 controls the amount of power that is used by the power supply 408 based on the distance that the token 400 is positioned from a transponder such as the transponder 104.

For example, the token 400 operates in a low power state until the token 400 is brought within approximately ten centimeters of a transponder/processor pair that is programmed to recognize communication signals from the token 400. Multiple token 400 operations may occur at this point. For example, the token 400 may automatically move to a high power state for further communications with the processor. In another embodiment, the token 400 may request the processor to validate itself prior to the token 400 moving into its high powered state. In yet another embodiment, the token 400 may wait until the processor has confirmed that the token 400 is a valid token prior to activating its high powered state. Regardless, when the token 400 recognizes that it may communicate with the processor in its high powered state, the token 400 changes into its high powered state and operates according to the programming in the token 400 and processor.

Figure 5:
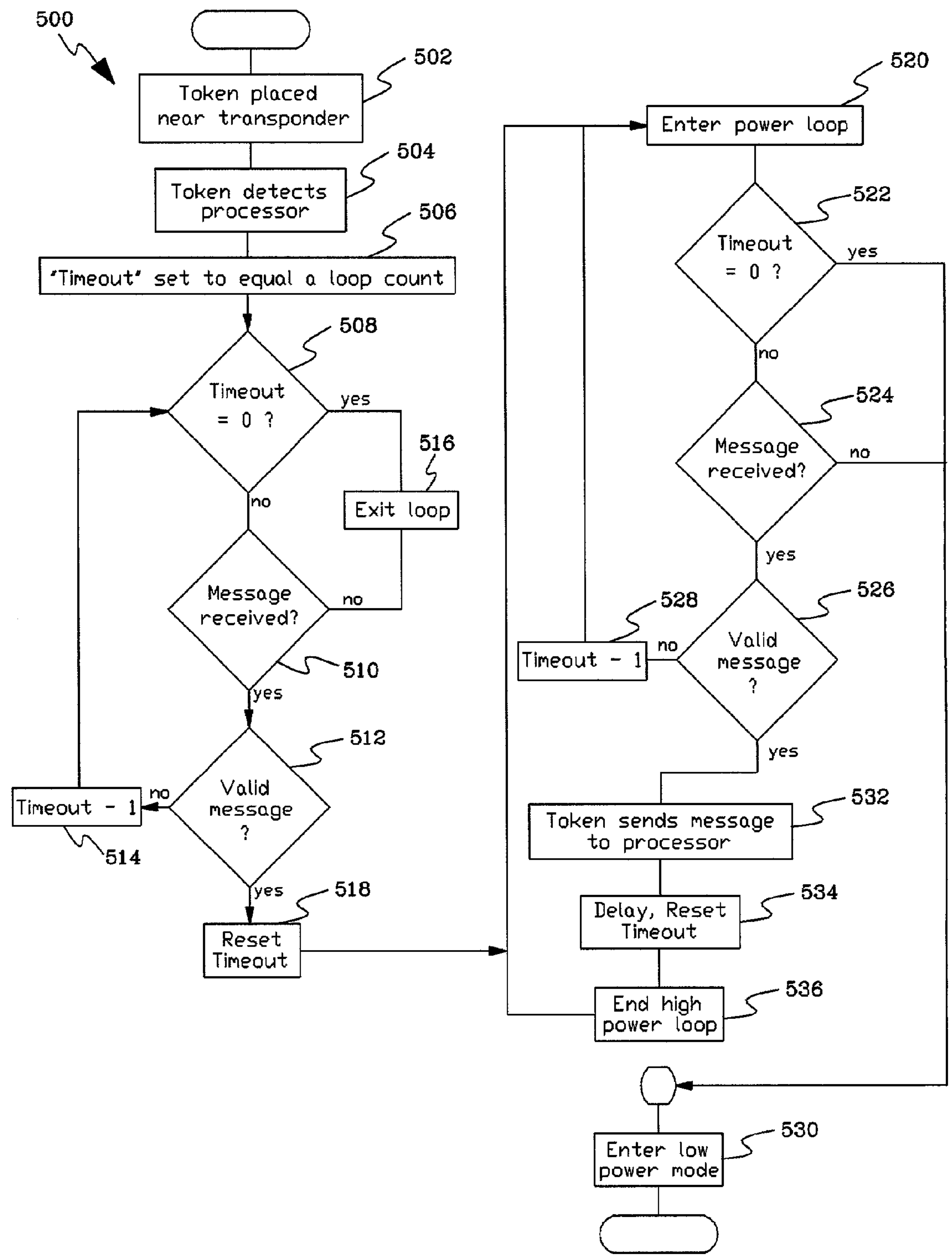
FIG. 5 is a flow diagram of an exemplary embodiment of a method for conserving power in a token, the method is similar to the method of FIG. 3, but includes an authentication loop in addition to the method of FIG. 3.

FIG. 5 is a flow diagram of an exemplary embodiment of a method 500 for conserving power in a token. The method 500 is similar to the method 300, but includes an authentication loop in addition to the flow diagram (method) 300. Similar to the method 300, initially, a token is placed near a transponder 502. The token is in a low power state and must be placed approximately ten centimeters from the transponder in order to communicate with the processor. Once the token detects the processor 504, a "Timeout" variable is set to equal a loop count 506 and an initial authentication loop is entered prior to raising the token to a high power state. In the first step 508, the Timeout variable value is checked, if it is not zero, a check is made for whether the token has received a message 510. If a message has been received and a valid message 512 indication from the processor indicates that the message is not valid, Timeout is decremented 514 and the loop returns to checking the value of Timeout 508. If Timeout has reached zero, the loop is exited 516, i.e., the token is not raised to a higher power state and the method 500 begins again. Alternatively, if Timeout has not reached zero, but no message is received 510, then the loop is also exited 516.

Once a valid message 512 is indicated, the Timeout variable is reset to equal the loop count 518 and the power loop is entered 520 by raising the token to its high power state and activating the processor. Timeout is checked for a zero value 522, if not zero, then a check is made for whether a message has been received 524. If a message has been received, a check is made on whether the message is valid 526. Similar to the first authentication loop, if the message is not found to be valid, Timeout is decremented 528 and the power loop 520 is reentered. If Timeout has reached zero, the loop is exited, the processor deactivated, and the token returned to low power mode 530. Also, if Timeout does not equal zero but no message is received 524, the processor is deactivated and the token returns to low power mode 530. However, if a valid message is detected 526, then the token sends a message to the processor 532 and a delay occurs with Timeout being reset 534. The delay 534 further assists in token power conservation because the token circuitry temporarily ceases to check all token variables while leaving the processor activated. After the delay 534, the high power loop ends 536 and another iteration of the power loop begins.

The above-listed sections and included information are not exhaustive and are only exemplary for contactless technology such as a token/processor combination herein described. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The invention claimed is:

1. A radio frequency (RF) device for authorizing user access to portions of a computer system composing:

a power supply;

processing circuitry that accesses the power supply according to a location of the RF device;

an antenna tat transmits communication signals from the processing circuitry to a transponder that is coupled to the computer system;

the processing circuitry being configured to operate at a first power level while the RF device is located outside a first range of the transponder, until the communication signals indicate that the location of the RF device is within the first range of the transponder, the processing circuitry being configured to begin operations at a second power level in response to detecting that the RF device has moved within the first range of the transponder; and the processing circuitry being configured to operate at the second power level until the communication signals indicate that the location of the RE device has moved outside of a second range from the transponder, the second range greater than the first range.

2. The RF device of claim 1 wherein the conununication signals are used to validate that the RF device is an authorized device prior to activating user access to the portions of the computer system.

3. The RF device of claim 1 wherein the communication signals are used to validate that the computer system is an authorized computer system for the RF device prior to the RF device operating at the second power level.

4. The RF device of claim 1 wherein the processing circuitry identifies the location of the RF device through communication signals that are received through the antenna.

5. The RF device of claim 1 wherein the processing circuitry operates at the first power level when the processing circuitry is unable to identify the location of the RF device.

6. The RF device of claim 1 wherein the computer system is inaccessible when the computer system is unable to identify the location of the RF device.

7. The RF device of claim 1 wherein the computer system periodically validates itself to the RF device and the RF device periodically validates itself to the computer system.

8. The RF device of claim 1 further comprising a key that is provided to the processing circuitry that the processing circuitry requires for high power transactions.

9. The RF device of claim 8 wherein the key for the high power transactions is modified over time.

10. The RF device of claim 1 wherein the first range is from five to twenty centimeters and the second range is from five to twenty meters.

11. The RF device of claim 1, wherein the second power level is greater than the first power level.

12. A radio frequency (RF) device for authorizing user access to portions of a computer system comprising:

a power supply;

processing circuitry that accesses the power supply according to a location of the RF device;

an antenna that transmits communication signals from the processing circuitry to a transponder that is coupled to the computer system;

the processing circuitry being configured to operate at a first power level while the RF device is located outside a first range of the transponder, until authentication signals verify that the location of the RF device if within the first range of the transponder, the processing circuitry being configured to being operations at a second power level in response to the processing circuitry detecting that the RF device has moved within the first range of the transponder; and the processing circuitry being configured to operate at the second power level until the location of the RF device is detected to have moved outside of a second range from the transponder, the second range greater than the first range.

13. The RF device of claim 12 wherein the communication signals are used to verify that the RF device is an authorized device prior to activating user access to the portions of the computer system.

14. The RF device of claim 12 wherein the communication signals are used to verify that the computer system is an authorized computer system for the RF device prior to the RF device operating at the second dower level.

15. The RF device of claim 12 wherein the processing circuitry operates at the first power level when the processing circuitry is unable to identify the location of the computer system.

16. The RF device of claim 12 wherein the first range is from five to twenty centimeters.

17. The RF device of claim 12 wherein the second range is from five to twenty meters.

18. The RF device of claim 12, wherein the second power level is greater than the first power level, and wherein the processing circuitry is configured to transition from the second power level to the first power level in response to detecting that the RF device has moved outside the second range of the transponder.

19. The RF device of claim 18, wherein the processing circuitry is configured to:

set a timeout period;

in response to detecting that the RF device has moved within the first range of the transponder, wait for receipt of a valid message from the transponder;

in response to detecting that a valid message has been received during the timeout period, begin operations at the second power level; and in response to detecting that a valid message has not been received during the timeout period, keep the processing circuitry at the first power level.

20. A method for an RF device to conserve power while controlling user access to a computer system having a transponder, the method comprising:

operating the RF device in a low power mode;

placing the RF device within a first range of the transponder to initiate RF communications between the RF device and the computer system while the RF device remains in the low power mode;

authenticating a valid identity for the RF device;

identifying portions of the computer system that a user with the RF device is permitted to access;

activating the identified portions of the computer system; and activating a high power state in the RF device in response to detecting that the RF device is within the first range of the transponder, the high power state to permit the RF device to maintain the activation of the identified portions of the computer system while the RF device remains within a second range of the transponder, the second range greater than the first range.

21. The method of claim 20 further comprising deactivating the high power state in the RF device when the RF communications between the RF device and the computer system cease.

22. The method of claim 20 further comprising, prior to activating the high power state in the RF device, authenticating the computer system as a valid computer system for operations with the RF device.

23. The method of claim 20, further comprising deactivating user access to the computer system in response to detecting that the RF device has moved outside of the second range from the computer system.

24. A method for an RF device to conserve power while controlling user access to a computer system having a transponder, the method comprising:

operating the RF device in a law power mode;

placing the RF device within ten centimeters of the transponder to initiate RF communications between the RF device and the computer system while the RF device remains in the low power mode;

authenticating a valid identity for the RF device;

identifying portions of the computer system that a user with the RF device is permitted to access;

activating the identified portions of the computer system;

activating a high power state in the RF device that permits the RF device to maintain the activation of the identified portions of the computer system while the RF device remains within 10 meters of the transponder; and deactivating user access to the computer system when the RF device is moved outside of ten meters from the computer system.

25. The RF device of claim 11, wherein the processing circuitry is configured to transition from the second power level to the first power level in response to detecting the RF device moving outside of the second range of the transponder.

26. The RF device of claim 25, wherein the processing circuitry is configured to set a timeout period, the processing circuitry to transition from the second power level to the first power level in response to the processing circuitry not receiving a valid message from the transponder during the timeout period.

* * * * *

UNITED STATES PATENT AND TRADEMARK OFFICE

CERTIFICATE OF CORRECTION

PATENT NO. : 7,149,556 B2
APPLICATION NO. : 10/165417
DATED : December 12, 2006
INVENTOR(S) : Michael F. Angelo et al.

It is certified that error appears in the above-identified patent and that said Letters Patent is hereby corrected as shown below:

In column 5, line 67, in Claim 1, delete “composing” and insert -- comprising --, therefor.

In column 6, line 4, in Claim 1, delete “tat” and insert -- that --, therefor.

In column 6, line 18, in Claim 1, delete “RE” and insert -- RF --, therefor.

In column 6, line 21, in Claim 2, delete “conununication” and insert -- communication --, therefor.

In column 6, line 64, in Claim 12, delete “if” and insert -- is --, therefor.

In column 6, line 66, in Claim 12, delete “being” and insert -- begin --, therefor.

In column 7, line 15, in Claim 14, delete “dower” and insert -- power --, therefor.

In column 8, line 24, in Claim 24, delete “law” and insert -- low --, therefor.

Signed and Sealed this

Fourth Day of August, 2009

John Doll

JOHN DOLL
*Acting Director of the United States Patent and Trademark Office*